Jan. 19, 1937.  C. C. FARMER  2,068,318
FLUID PRESSURE BRAKE
Filed Feb. 13, 1935
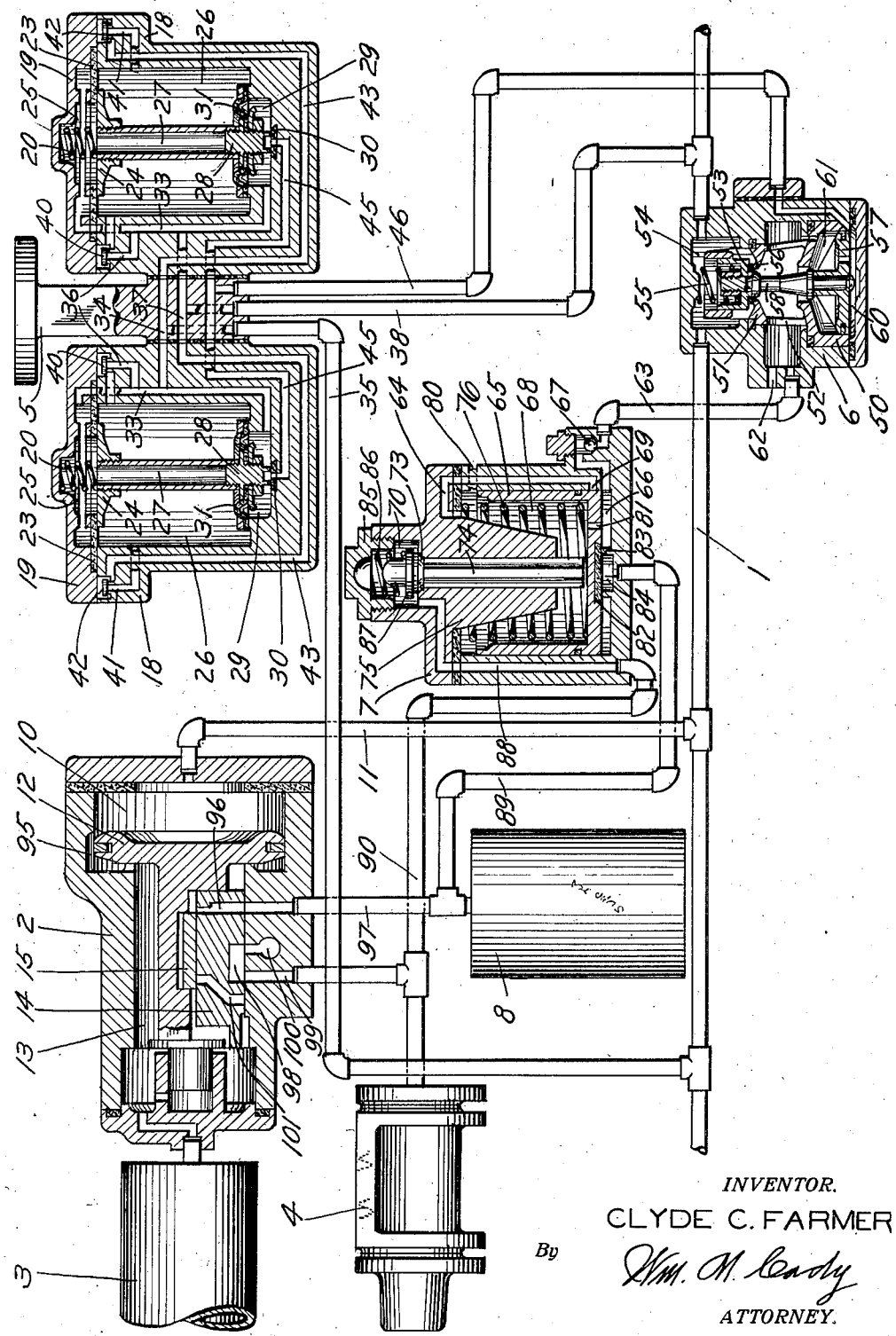
INVENTOR.
CLYDE C. FARMER
By
ATTORNEY.

Patented Jan. 19, 1937

2,068,318

UNITED STATES PATENT OFFICE 2,068,318

FLUID PRESSURE BRAKE

Clyde C. Farmer, Pittsburgh, Pa., assignor to The Westinghouse Air Brake Company, Wilmerding, Pa., a corporation of Pennsylvania Application February 13, 1935, Serial No. 6,322

18 Claims. (Cl. 303—46)

This invention relates to fluid pressure brakes, and more particularly to means for controlling the supply of fluid under pressure to the brake cylinder in an emergency application of the brakes.

The principal object of the invention is to provide an improved means for securing a high brake cylinder pressure in an emergency application of the brakes.

In the accompanying drawing, the single figure is a diagrammatic view, partly in section, of a fluid pressure brake equipment embodying the invention.

As shown in the drawing, the fluid pressure brake equipment may comprise a brake pipe 1, a triple valve device 2, an auxiliary reservoir 3, a brake cylinder 4, a transmitting valve device 5, a vent valve device 6, and according to my invention, an emergency valve device 7 and an emergency reservoir 8.

The triple valve device 2 comprises a casing having a piston chamber 10 connected through a pipe 11 to the brake pipe 1 and containing a piston 12, and having a valve chamber 13 connected to the auxiliary reservoir 3 and containing a main slide valve 14 and a graduating slide valve 15, adapted to be operated by said piston.

The transmitting valve device 5 is of the type operated by the gradient in pressure set up between two points in the brake pipe, such as at points near the opposite ends of a car, when an emergency rate of reduction in brake pipe pressure is initiated, and adapted to effect a local reduction in brake pipe pressure for propagating quick action throughout the train.

The transmitting valve device 5 comprises a pipe bracket having secured thereto a pair of similarly constructed quick action valve mechanisms, each comprising casing sections 18 and 19. Clamped between the casing sections 18 and 19 in each valve mechanism is a flexible diaphragm 23, to which is clamped a centrally disposed disk 24, forming on one side a chamber 25 and on the opposite side a chamber 26. A stem 27, secured at one end to the disk 24, extends through chamber 26 and is secured at the opposite end to a valve member 28, which extends into a valve chamber 29 and is provided with a valve adapted to engage a seat rib 30. A spring 26 is provided in the chamber 25 and acts against the stem 27 for urging the valve into engagement with the seat rib 30. A flexible diaphragm 31, having a smaller pressure area than that of diaphragm 23, is disposed between chamber 26 and valve chamber 29 for preventing communication between said chambers, said diaphragm being clamped to the lower wall of chamber 26 and to the valve member 28.

The chambers 25 and 29 of the left hand valve mechanism are connected through a passage 33 to a passage 34, which leads to a pipe 35, which in turn is connected to the brake pipe 1 at a point near one end of the car, and similarly, the chambers 25 and 29 of the right hand valve mechanism are connected through the passage 33 to a passage 37, which leads to a pipe 38, connected to the brake pipe 1 at a point near the opposite end of the car. A branch 36 of passage 33 leads past a check valve 40 to chamber 26, said check valve being adapted to permit flow of fluid from the brake pipe to said chamber. The chamber 26 is connected through a passage 41 and past a check valve 42 to a passage 43, which, in the left hand valve mechanism, leads to the passage 37, and in the right hand valve mechanism leads to the passage 34. The valve seat 30 in each valve mechanism is connected through a passage 45 to a pipe 46, which leads to the vent valve device 6.

The vent valve device 6 comprises a casing having mounted therein a vent valve holding cage, said cage comprising a bushing portion 50 and a valve holding portion 51 united by a webbing 52. A vent valve 53 is contained in a chamber 54 connected to the brake pipe 1, and a spring 55 is provided in said chamber for urging said vent valve into engagement with a seat rib 56. A piston 57 is mounted in the bushing portion 50 and is connected to the vent valve 53 by means of a stem 58, said piston being operative to unseat said vent valve. The piston has at one side a chamber 60 connected to the pipe 46, and at the other side a chamber 61 which is open to atmosphere through a port 62 and is also connected to a pipe 63 leading to the emergency valve device 7.

According to the invention, the emergency valve device 7 comprises a casing having a bore in which is slidably mounted a valve piston device 65, and a valve chamber 70 containing a valve 73 which is provided with a fluted stem 74 extending through a suitable bore in a sleeve portion 75 of the casing, and is adapted to be operated by said piston device, a small clearance being normally maintained between the operative end of said fluted stem and the piston device.

The valve piston device 65 has at one side a chamber 66, to which the pipe 63 is connected past a ball check valve 67, and has at the other side a chamber 68, which is normally open to atmosphere through a port 80, and is connected through a passage 64 to a port 69 which opens to the piston bore, said port being normally closed by the piston device. A restricted leakage port 81 is provided through the valve piston device 65 for permitting the venting of chamber 66 so as to insure against undesired operation.

A valve seat member 82 is secured to the lower face of the piston device 65, said valve seat being preferably made of resilient material and so formed that it may be wedged into a suitable cavity in said piston device, and said valve seat is adapted to engage a seat rib 83 carried by the casing. A spring 76 is provided in chamber 68 and acts against the inner side of the valve piston device 65 for urging the valve seat 82 into engagement with the seat rib 83. The valve seat is adapted to control communication from chamber 66 to a chamber 84 connected through a pipe 89 to the emergency reservoir 8.

The outer end of the chamber 70 is closed by a cap nut 85, and a spring 86 is provided between said cap nut and a collar 87 of the valve 73 for urging said valve to its seat. The chamber 70 is connected through a passage 88 to a brake cylinder pipe 90 which leads to the brake cylinder 4.

In operation, fluid under pressure supplied to the brake pipe in the usual manner flows through pipe 11 to piston chamber 10 in the triple valve device 2, and thence, with the piston 12 in release position, as shown in the drawing, through the usual feed groove 95 to valve chamber 13, thereby charging said chambers. Fluid under pressure flows from chamber 13 to the auxiliary reservoir 3, and through a passage 96 in the main slide valve 14 and a pipe 97 to the emergency reservoir 8. A cavity 98 in main slide valve 14 connects a passage 99 leading to the brake cylinder pipe 90 to an atmospheric exhaust port 100, so that the brake cylinder 4 is vented to atmosphere.

Fluid under pressure from the brake pipe 1 also flows through the pipe 35 and passage 34 in the transmitting valve device 5 to passage 33 in the left hand valve mechanism, and thence to chambers 25 and 29, and through passage 36 and past check valve 40 to chamber 26, thereby charging said chambers. In a similar manner, the chambers 25, 29, and 26 of the right hand valve mechanism of the transmitting valve device 5 are charged with fluid under pressure from the brake pipe.

When the pressure of fluid in the brake pipe is gradually reduced, in effecting a service application of the brakes, the fluid pressure in chamber 10 of the triple valve device 2 is correspondingly reduced, and the auxiliary reservoir pressure in valve chamber 13 moves the piston 12 toward the right hand, first actuating the graduating slide valve 15 to lap the passage 96 and to uncover a passage 101 in the main slide valve 14, and then moving said main slide valve so as first to cut off communication from the passage 99 to the atmosphere and then connect passage 99 to the passage 101. Fluid under pressure then flows from the valve chamber 13 and connected auxiliary reservoir 3 through passages 101 and 99 and pipe 90 to the brake cylinder 4, thereby effecting an application of the brakes.

In effecting a service application of the brakes as above described, the gradual reduction in brake pipe pressure is inadequate to produce a sufficient gradient in brake pipe pressure between the two points in the brake pipe at which the pipes 35 and 38 are connected to said brake pipe to cause an operative pressure differential in either valve mechanism of the transmitting valve device, which consequently remains inoperative.

If it is desired to effect a release of the brakes after a service application, the brake pipe pressure is increased in the usual manner. The resulting increase in pressure in the triple valve piston chamber 10 shifts the piston 12, main slide valve 14, and graduating slide valve 15 to release position, in which fluid under pressure is vented from the brake cylinder 4 through pipe 90, passage 99, cavity 98 in said main slide valve, and atmospheric exhaust port 100, thereby releasing the brakes. With the triple valve device in release position, fluid at brake pipe pressure is supplied from chamber 10 through the feed groove 95 to valve chamber 13 and connected auxiliary reservoir 3, while fluid under pressure from the emergency reservoir 8 also flows back to the auxiliary reservoir 3 by way of pipe 97 and passage 96 in the main slide valve, said passage being open to valve chamber 13. Charging of the auxiliary reservoir 3 is thereby accelerated by equalization with the emergency reservoir 8, after which said reservoirs are both charged to the pressure carried in the brake pipe in the same manner as in initially charging the brake equipment.

The pressures in the chambers 25, 26, and 29 of the transmitting valve device are built up to the pressure carried in the brake pipe in the manner hereinbefore described.

If a sudden reduction in brake pipe pressure at an emergency rate is initiated in the brake pipe at a point to the left of the pipe 35, the reduction in fluid pressure in chamber 10 of the triple valve device 2 permits movement of said piston toward the right hand, actuating the slide valves 15 and 14, so as to connect the passage 101 with passage 99 for permitting fluid from the auxiliary reservoir 3 to flow to the brake cylinder in the same manner as in effecting a service application of the brakes. In addition, the reduction in brake pipe pressure at an emergency rate sets up a gradient or difference of pressure in the brake pipe between the points at which pipes 35 and 38 connect with the brake pipe, and the fluid pressure in chambers 25 and 29 of the left hand valve mechanism of the transmitting valve device 5 is thereby reduced, by flow of fluid through passages 33 and 34 and pipe 35, to a degree below the pressure of fluid in chamber 26.

While this differential pressure may be light, it is sufficient to operate the diaphragm 23, and the higher fluid pressure in chamber 26 moves said diaphragm upwardly, together with the stem 27 and valve member 28, so that the valve is lifted from the valve seat 30. Fluid under pressure is thereby permitted to flow from the brake pipe through pipe 35, passages 34 and 33, chamber 29, past valve seat 30, through passage 45 and pipe 46 to chamber 60 in the vent valve device 6.

It will be noted that if an emergency rate of reduction in brake pipe pressure be initiated at a point in the brake pipe to the right of the juncture of pipe 38 and the brake pipe, then the right hand valve mechanism of the transmitting valve device 5 will be operated in a manner similar to that just described in connection with the left hand valve mechanism.

With fluid under pressure supplied from the transmitting valve device acting in chamber 60 of the vent valve device, the piston 57 is thereupon shifted, so as to open the vent valve 53 and thus permit fluid under pressure to be locally vented from the brake pipe 1 by way of chamber 54, past valve 53, and through chamber 61 and atmospheric exhaust port 62.

A portion of the fluid under pressure vented to chamber 61, however, flows through pipe 63, lifts the check valve 67, and flows to chamber 66 of the emergency valve device 7. The consequent build-up of pressure in chamber 66 at a rate faster than that at which it can reduce by flow of fluid through the restricted leakage port 81 in the valve piston device 65, augmented by the emergency reservoir pressure acting in chamber 84, is sufficient to move said valve piston device upwardly, against the opposing pressure of spring 76, thereby closing port 80, bringing said valve piston device into operating engagement with the fluted stem 74, and unseating the valve seat 82. Fluid under pressure then flows from the emergency reservoir 8 through pipe 89 and chamber 84 to the chamber 66, and the fluid pressure acting against the valve piston device 65 is suddenly increased so as quickly to move said piston device and fluted stem 74 upwardly, thereby unseating the valve 73 and uncovering the port 69.

Fluid under pressure is then supplied from the emergency reservoir 8 through pipe 89, chambers 84 and 66, port 69, passage 64, chamber 68, past fluted stem 74, and valve 73, and thence through chamber 70, passage 88, and pipe 90 to the brake cylinder 4, thereby providing a brake cylinder pressure higher than that effected in a service application of the brakes.

It will be noted that the check valve 67 in the emergency valve device 7 prevents back flow of fluid under pressure from the emergency reservoir 8 to the vent valve device, following the unseating of valve disk 82.

When the fluid pressures in the emergency reservoir 8 and the brake cylinder 4 have equalized, so that the opposing fluid pressures acting on valve piston device 65 have become equal, the springs 86 and 76 act to move valve 73, stem 74, and piston device 65 downwardly, until valves 73 and 82 are seated and chamber 68 is connected to atmosphere through port 80. Fluid under pressure is thereby vented from chambers 66 and 68 through leakage port 81 and port 80.

To effect a release of the brakes after an emergency application, fluid under pressure is supplied to the brake pipe in the usual manner and thence to the triple valve device 2, which is thereupon operated to vent fluid under pressure from the brake cylinder 4 and to supply fluid under pressure to the auxiliary reservoir 3 and to the emergency reservoir 8 in the same manner as hereinbefore described.

It will be evident that, in accordance with the invention, means is provided which is operative, when brake pipe pressure is reduced at an emergency rate, to supply fluid under pressure from an emergency reservoir to the brake cylinder, thereby effecting the desired high brake cylinder pressure.

While one illustrative embodiment of the invention has been described in detail, it is not my intention to limit its scope to that embodiment or otherwise than by the terms of the appended claims.

Having now described my invention, what I claim as new and desire to secure by Letters Patent, is:

1. In a fluid pressure brake, in combination, a brake pipe, an emergency reservoir, means for charging said emergency reservoir with fluid under pressure from the brake pipe, a brake cylinder, a vent valve device operated by a variation in fluid pressure for venting fluid under pressure locally from the brake pipe, a transmitting valve device operatively responsive to the pressure gradient produced between two points in the brake pipe upon a sudden reduction in brake pipe pressure for varying the fluid pressure on said vent valve device, and means actuated by fluid under pressure discharged from the brake pipe by said vent valve device for supplying fluid under pressure from the emergency reservoir to the brake cylinder.

2. In a fluid pressure brake, in combination, a brake pipe, a brake cylinder, an emergency reservoir, quick action means operative to effect a local reduction in brake pipe pressure, a movable abutment having a chamber at one side subject to pressure of fluid discharged from the brake pipe by operation of said quick action means, means operative upon movement of said abutment for opening communication from the emergency reservoir to said chamber and from said chamber to a chamber at the opposite side of said abutment, and valve means operated by said abutment for supplying fluid from said last mentioned chamber and consequently from the emergency reservoir to the brake cylinder.

3. In a fluid pressure brake, in combination, a brake pipe, a brake cylinder, a reservoir, a movable abutment subject on one side to the pressure of the fluid in a chamber and controlling the supply of fluid under pressure from the reservoir to the brake cylinder, biasing means associated with said abutment and normally operative to maintain said abutment in a position to cut off the supply of fluid from the reservoir to the brake cylinder, the abutment being moved to a position to permit fluid to flow from the reservoir to the brake cylinder on an increase in the pressure of the fluid in said chamber, means operated upon a reduction of the pressure of the fluid in the brake pipe for supplying fluid under pressure to said chamber, and means operated by movement of the abutment by said fluid under pressure for supplying fluid under pressure to said chamber.

4. In a fluid pressure brake, in combination, a brake pipe, a brake cylinder, a reservoir, a movable abutment subject on one side to the pressure of the fluid in a chamber and controlling the supply of fluid under pressure from the reservoir to the brake cylinder, biasing means associated with said abutment and normally operative to maintain said abutment in a position to cut off the supply of fluid from the reservoir to the brake cylinder, the abutment being moved to a position to permit fluid to flow from the reservoir to the brake cylinder on an increase in the pressure of the fluid in said chamber, means operated upon a reduction in the pressure of the fluid in the brake pipe for supplying fluid under pressure to said chamber, and means operated by movement of the abutment by said fluid under pressure for supplying fluid under pressure from said reservoir to said chamber.

5. In a fluid pressure brake, in combination, a brake pipe, a brake cylinder, a reservoir, a movable abutment subject on one side to the pressure of the fluid in a chamber and controlling the supply of fluid under pressure from the reservoir to the brake cylinder, biasing means associated with said abutment and normally operative to maintain said abutment in a position to cut off the supply of fluid from the reservoir to the brake cylinder, the abutment being moved to a position to permit fluid to flow from the reservoir to the brake cylinder on an increase in the pressure of the fluid in said chamber, means operated upon a reduction in the pressure of the fluid in the brake pipe for supplying fluid under pressure from the brake pipe to the said chamber, and means operated by movement of the abutment by fluid under pressure supplied to said chamber from the brake pipe for supplying fluid under pressure from the reservoir to the chamber.

6. In a fluid pressure brake, in combination, a brake pipe, a brake cylinder, a reservoir, a movable abutment subject on one side to the pressure of the fluid in a chamber and controlling the supply of fluid under pressure from the reservoir to the brake cylinder, biasing means associated with said abutment and normally operative to maintain said abutment in a position to cut off the supply of fluid from the reservoir to the brake cylinder, the abutment being moved to a position to permit fluid to flow from the reservoir to the brake cylinder on an increase in the pressure of the fluid in said chamber, means operated upon a reduction in the pressure of the fluid in the brake pipe for venting fluid under pressure from the brake pipe and for supplying fluid under pressure from the brake pipe to said chamber, and means operated by movement of the abutment by fluid under pressure supplied to said chamber from the brake pipe for supplying fluid under pressure from said reservoir to said chamber.

7. In a fluid pressure brake, in combination, a brake cylinder, a brake pipe, a reservoir, a movable abutment controlling the supply of fluid under pressure from the reservoir to the brake cylinder, said abutment being subject to the opposing pressures of the fluid in chambers on opposite sides thereof, biasing means associated with the abutment and urging said abutment to a normal position in which the supply of fluid under pressure from the reservoir to the brake cylinder is cut off, the abutment being operated on an increase in the pressure of the fluid in one of said chambers to a value above the pressure of the fluid in the other of said chambers to move from said normal position to a position in which fluid is permitted to flow from the reservoir to the brake cylinder, means operative on a reduction in the pressure of the fluid in the brake pipe to supply fluid under pressure to the chamber on one side of the abutment to effect movement of the abutment away from the normal position, means operative on movement of the abutment away from the normal position for supplying fluid under pressure to said chamber, and means for supplying fluid under pressure from said chamber to the other of said chambers at a restricted rate.

8. In a fluid pressure brake, in combination, a brake cylinder, a brake pipe, a reservoir, a movable abutment controlling the supply of fluid under pressure from the reservoir to the brake cylinder, said abutment being subject to the opposing pressures of the fluid in chambers on opposite sides thereof, biasing means associated with the abutment and urging said abutment to a normal position in which the supply of fluid under pressure from the reservoir to the brake cylinder is cut off, the abutment being operated on an increase in the pressure of the fluid in one of said chambers to a value above the pressure of the fluid in the other of said chambers to move from said normal position to a position in which fluid is permitted to flow from the reservoir to the brake cylinder, means operative on a reduction in the pressure of the fluid in the brake pipe to supply fluid under pressure to the chamber on one side of the abutment to effect movement of the abutment away from the normal position, means operative on movement of the abutment away from the normal position for supplying fluid under pressure from said reservoir to said chamber, and means for supplying fluid under pressure from said chamber to the other of said chambers at a restricted rate.

9. In a fluid pressure brake, in combination, a brake pipe, a brake cylinder, a reservoir, a movable abutment subject on one side to the pressure of the fluid in a chamber and controlling the supply of fluid under pressure from the reservoir to the brake cylinder, biasing means associated with said abutment and yieldingly urging the abutment to a position to cut off the supply of fluid from the reservoir to the brake cylinder, the abutment being moved to a position to permit fluid to flow from the reservoir to the brake cylinder on an increase in the pressure of the fluid in said chamber, means operative upon a reduction in the pressure of the fluid in the brake pipe for supplying fluid under pressure from the brake pipe to said chamber, and means operative by movement of the abutment by fluid under pressure supplied to said chamber from the brake pipe for supplying fluid under pressure to said chamber.

10. In a fluid pressure brake, in combination, a brake pipe, a brake cylinder, a reservoir, a valve device comprising a movable abutment subject to and operated on an increase in the pressure of the fluid in a chamber to establish communication between said reservoir and said chamber and between said chamber and the brake cylinder, and means operated on a reduction in the pressure of the fluid in the brake pipe for supplying fluid under pressure to said chamber.

11. In a fluid pressure brake, in combination, a brake pipe, a brake cylinder, a reservoir, a valve device comprising a movable abutment subject to and operated on an increase in the pressure of the fluid in a chamber to establish communication between said reservoir and said chamber and between said chamber and the brake cylinder, and means operated on a reduction in the pressure of the fluid in the brake pipe for supplying fluid under pressure from the brake pipe to said chamber.

12. In a fluid pressure brake, in combination, a brake pipe, a brake cylinder, a reservoir, a valve device comprising a movable abutment subject to and operated on an increase in the pressure of the fluid in a chamber to establish communication between said reservoir and said chamber and to also establish communication between said reservoir and the brake cylinder, and means operated on a reduction in the pressure of the fluid in the brake pipe for supplying fluid under pressure to said chamber.

13. In a fluid pressure brake, in combination, a brake pipe, a brake cylinder, a reservoir, a valve device comprising a movable abutment subject to and operated on an increase in the pressure of the fluid in a chamber to establish communication between said reservoir and said chamber and to also establish communication between said reservoir and the brake cylinder, and means operated on a reduction in the pressure of the fluid in the brake pipe for supplying fluid under pressure from the brake pipe to said chamber.

14. In a fluid pressure brake, in combination, a brake pipe, a brake cylinder, a reservoir, a valve device comprising a movable abutment subject to and operated on an increase in the pressure of the fluid in a chamber to establish communication between said reservoir and said chamber and to also establish communication between said reservoir and the brake cylinder, valve means controlling a passage communicating with the brake pipe and with the chamber in said valve device, said valve means being operative on a reduction in the pressure in the brake pipe to open communication through said passage, and a check valve operative to permit fluid to flow from said valve means to said chamber through said passage and prevent the flow of fluid from said chamber to said valve means through said passage.

15. In a fluid pressure brake, in combination, a brake pipe, a brake cylinder, a reservoir, a valve device comprising a movable abutment subject to and operated on an increase in the pressure of the fluid in a chamber to establish communication between said reservoir and said chamber and between said chamber and the brake cylinder, valve means controlling a passage communicating with the brake pipe and with the chamber in said valve device, said valve means being operative on a reduction in the pressure in the brake pipe to open communication through said passage, and a check valve operative to permit fluid to flow from said valve means to said chamber through said passage and to prevent the flow of fluid from said chamber to said valve means through said passage.

16. In a fluid pressure brake, in combination, a brake pipe, a brake cylinder, a reservoir, a valve device comprising a movable abutment subject to and operated on an increase in the pressure of the fluid in a chamber to establish communication between said reservoir and said chamber and to also establish communication between said reservoir and the brake cylinder, valve means operative on a reduction in the pressure of the fluid in the brake pipe for supplying fluid under pressure to said chamber through a supply passage, and a check valve interposed in said supply passage and operative to permit fluid to flow to said chamber through said passage and to prevent the flow of fluid from said chamber through said passage.

17. In a fluid pressure brake, in combination, a brake pipe, a brake cylinder, a reservoir, quick action means operative to effect a local reduction in brake pipe pressure, a movable abutment initially operative by fluid under pressure discharged from the brake pipe by the quick action means and supplied to a chamber at one side of said abutment, means operative upon initial movement of said abutment for opening communication from the reservoir to said chamber, and a valve operative on a predetermined amount of movement of said abutment for supplying fluid under pressure from said reservoir to the brake cylinder.

18. In a fluid pressure brake, in combination, a brake pipe, a brake cylinder, a reservoir, quick action means operative to effect a local reduction in brake pipe pressure, a movable abutment initially operative by fluid under pressure discharged from the brake pipe by the quick action means and supplied to a chamber at one side of said abutment, means operative upon initial movement of said abutment for opening communication from the reservoir to said chamber and from said chamber to a chamber at the opposite said of said abutment, and a valve operative after a given amount of movement of said abutment for supplying fluid under pressure from the last named chamber and consequently from the reservoir to the brake cylinder.

CLYDE C. FARMER.